United States Patent [19]
Bromley et al.

[11] Patent Number: 5,818,610
[45] Date of Patent: Oct. 6, 1998

[54] SCANNER FRAME

[75] Inventors: Eric Bromley, West Simsbury, Conn.; Yoshiyuki Okamura; Takayuki Kihara, both of Kawaguchi, Japan

[73] Assignee: B.C. Labs, Inc., Windsor, Conn.

[21] Appl. No.: 309,957

[22] Filed: Sep. 21, 1994

[51] Int. Cl.$^6$ .............................. H04N 1/024; H04N 1/04
[52] U.S. Cl. .......................... 358/473; 358/471; 358/474; 358/494; 358/497
[58] Field of Search ................................. 358/473, 474, 358/471, 494, 497, 400, 401, 447, 505

[56] References Cited

U.S. PATENT DOCUMENTS

| | | |
|---|---|---|
| 4,358,794 | 11/1982 | Kurakami et al. . |
| 4,500,917 | 2/1985 | Yamada . |
| 4,641,357 | 2/1987 | Satoh . |
| 4,684,998 | 8/1987 | Tanioka et al. .......................... 358/497 |
| 4,692,812 | 9/1987 | Hirahara et al. . |
| 4,725,889 | 2/1988 | Yaniv et al. . |
| 4,768,096 | 8/1988 | Cannella et al. . |
| 4,792,858 | 12/1988 | Landsman . |
| 4,797,106 | 1/1989 | Umerhara et al. . |
| 4,797,544 | 1/1989 | Montgomery et al. . |
| 4,803,561 | 2/1989 | Kubota . |
| 4,860,377 | 8/1989 | Ishigaki .................................... 358/494 |
| 5,049,999 | 9/1991 | Stemmle . |
| 5,072,304 | 12/1991 | Abe et al. . |

OTHER PUBLICATIONS

Summagraphics, *Summagraphics and Houston Instrument. The Choice of Today'Computer Professionals*, 1991 Summagraphics Corporation.

Logitech, *Tools for The Imagination*, 1989 Logitech.

The Complete PC, *The Complete Half–Page Scanner/GS*, 1991 The Complete PC, Inc.

The Complete PC, *The Complete PC Page Scanners*, 1991 The Complete PC. Inc.

Japan Digital Laboratory, *Express Plotter*, 1991, JDL.

Envisions Solutions Technology, Inc., *Envision It . . . Scan Drawings into Generic CADD Easily and Quickly*, 1991 Envisions Solutions Technology, Inc.

CADalyst for the Professional Management of AutoCAD Systems, *JDL Express Plotter Receives "Highly Recommended" Rating*, 1991 by CADalyst Publications Ltd.

Japan Digital Laboratory, *JDL Express Write Thermal Media*, 1991, JDL.

*Primary Examiner*—Edward L. Coles, Sr.
*Assistant Examiner*—Thomas D. Lee
*Attorney, Agent, or Firm*—Fishman, Dionne & Cantor

[57] ABSTRACT

A scanner frame comprises a vertical track which is slidably attached at one end thereof to a horizontal track. The horizontal track is attached to a drawing board or any other suitable flat surface. An optical imaging device (i.e., an optical scanner) is slidably attached to the vertical track. A marker strip comprising a series of bars of uniform pitch are disposed on a surface of the horizontal track along the length thereof. These bars are detected by a sensor assembly disposed on the vertical track. Another marker strip comprising a series of bars of uniform pitch are disposed on a surface of the vertical track along the length thereof. These bars are detected by a sensor assembly disposed on the scanner. During use, a drawing to be scanned is secured on a board, the vertical track is positioned at the left-most position and the scanner is positioned at the upper end of the vertical track. Start and finish index marks are established, either by manual selection, or by automatic reading of existing lines of the drawing, e.g. boarders. Once the extents (i.e., the start and finish index locations) are entered, the system has been initialized. Scanned segments, which are a relatively small portion of the original drawing being scanned, are stored in blocks of data which are sequentially appended by the system software to a previously scanned block of data. These blocks of data are assembled with reference to a physical location which is measured by the sensor assemblies and the corresponding marker strips. Each block is stored with a header code identifying it. Accordingly, the system software will correctly position each block according to that block's header code. This is why the order in which the document is scanned is not important.

19 Claims, 6 Drawing Sheets

SCANNER FRAME

BACKGROUND OF THE INVENTION

The present invention relates to optical scanners. More particularly, the present invention relates to an improved scanner frame having an optical scanner.

In general frames for scanners are known, however none of these are known to include the novel features of the present invention.

By way of example, U.S. Pat. No. 4,684,998 to Tanioka et al. discloses an image reader which is slidable on a table in one direction with the position of the reading head being optically detected. The reading head includes light emitting diodes for detecting slits in the table along the direction of movement. From the origin these slits are counted to determine distance from the origin.

A further example is U.S. Pat. No. 4,692,812 to Hirahara et al which discloses an image reader which overlaps a portion of the document being scanned on each pass. This over lapping seeks to remove distortion in the images at the scanning boundaries. Each pass of the reader fills a buffer which includes the overlap portion. The information in the buffers defining the overlap portion are combined wherein the overlap portion in each buffer is weighted and added.

SUMMARY OF THE INVENTION

In accordance with the present invention the scanner frame comprises a vertical track which is slidably attached at one end thereof to a horizontal track. The horizontal track is attached to a drawing board or any other suitable flat surface. The horizontal track has a plurality of spaced apart detentes along one side thereof to define stops at fixed increments. A sliding carrier is disposed on the vertical track. An optical imaging device (i.e., an optical scanner) is attached to the carrier, whereby the scanner travels along the vertical track.

A marker strip, comprising a series of bars of uniform pitch, is affixed at a surface of the horizontal track along the length thereof. These bars are detected by a sensor assembly disposed on the vertical track. Another marker strip, also comprising a series of bars of uniform pitch, is affixed at a surface of the vertical track along the length thereof. These bars are detected by a sensor assembly mounted to the carrier. The spacing between the detentes is dictated by the width at which the scanner reads. It is preferred that the spacing between the detentes be slightly less than the width the scanner is capable of reading. This overlap will assure that all of the drawing is being scanned and will allow for the correction of mechanical inaccuracies in the frame and detente positions. The system may discard some or all of the overlapped area scanned by only reading a predetermined number of pixels, which is determined by counting a predetermined number of bars on the horizontal marker strip, which is less than the total number of pixels read by the overlapped amount.

The scanner includes means for reading an area scanned comprising an array of light emitting diodes, an optical lens and mirror configuration for directing an image to a charge coupled device (CCD). Controls include visual indicators for 'IN OPERATION', 'ALARM' and 'INSIDE INDEXED AREA'. Controls further include actuators for 'START/STOP', 'POST SCAN' and 'NO-SCAN'. Controls and the scanner interface with a computer through an interface circuit.

During use, a drawing to be scanned is secured on a board, the vertical track is positioned at the left-most position of the drawing and the scanner is positioned at the uppermost position of the drawing. Start and finish index marks are established either by manual selection, or automatical reading of existing lines of the drawing, e.g., boarders. Once the extents (i.e., the start and finish index locations) are entered, the system has been initialized. When a block or column of data has been scanned, system software will prevent data which has already been scanned from accidently being rescanned. Scanned segments, which are a relatively small portion of the original drawing being scanned, are stored in blocks of data which are merged by the system software to generate a single drawing file. These blocks of data, which are originally stored as separate files, are assembled with reference to a physical location which is measured by the sensor assemblies in conjunction with the corresponding marker strips. Each block is stored with a header code identifying it. Accordingly, the system software will correctly position each block according to that block's header code. This is why the order in which the document is scanned is not important.

Each marker strip is comprised of a series of equally spaced apart printed lines (i.e., the bars, also referred herein to as markers), whose pitch determines the resolution of the system. Accordingly, when the corresponding sensor assembly reads these lines a series or train of pulses are produced. The number of pulses can be doubled by triggering on both the rising and falling edges, as is well known, this doubles the resolution of the system. Next, the time period between a pair of pulses is calculated in system software to predict the midpoint of the period between the next pair of pulses. This time is divided by two and stored to provide a pulse initiate count. Thereafter, when the rising edge of the next pulse is encountered the pulse initiator count is started and at the end of its count a pulse is inserted. This is repeated for each subsequent pair of pulses. This method effectively doubles the previously doubled resolution. It will be appreciated that more than one pulse may be inserted creating various multiples of the doubled resolution.

In an alternate embodiment the number of pulses is increased by combining the outputs of the two photosensors in a pair, thereby providing the effective increased counter resolution.

It is preferred that the count employ quadrature, whereby the direction of travel of the scanner is known. Accordingly, each marker strip is preferably comprised of a first and second shifted series of lines. Each series of lines is read by a separate photosensor. It is important that each photosensor pair be in alignment with the markers. Accordingly depending on which line is detected next by the corresponding photo sensor, the direction of travel will be known. At least one of the photosensor output is used to determine position.

Alternatively, the photosensors in a pair are rotated rather than aligned relative to a single marker strip whereby the shift is created by the rotated sensor pair.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
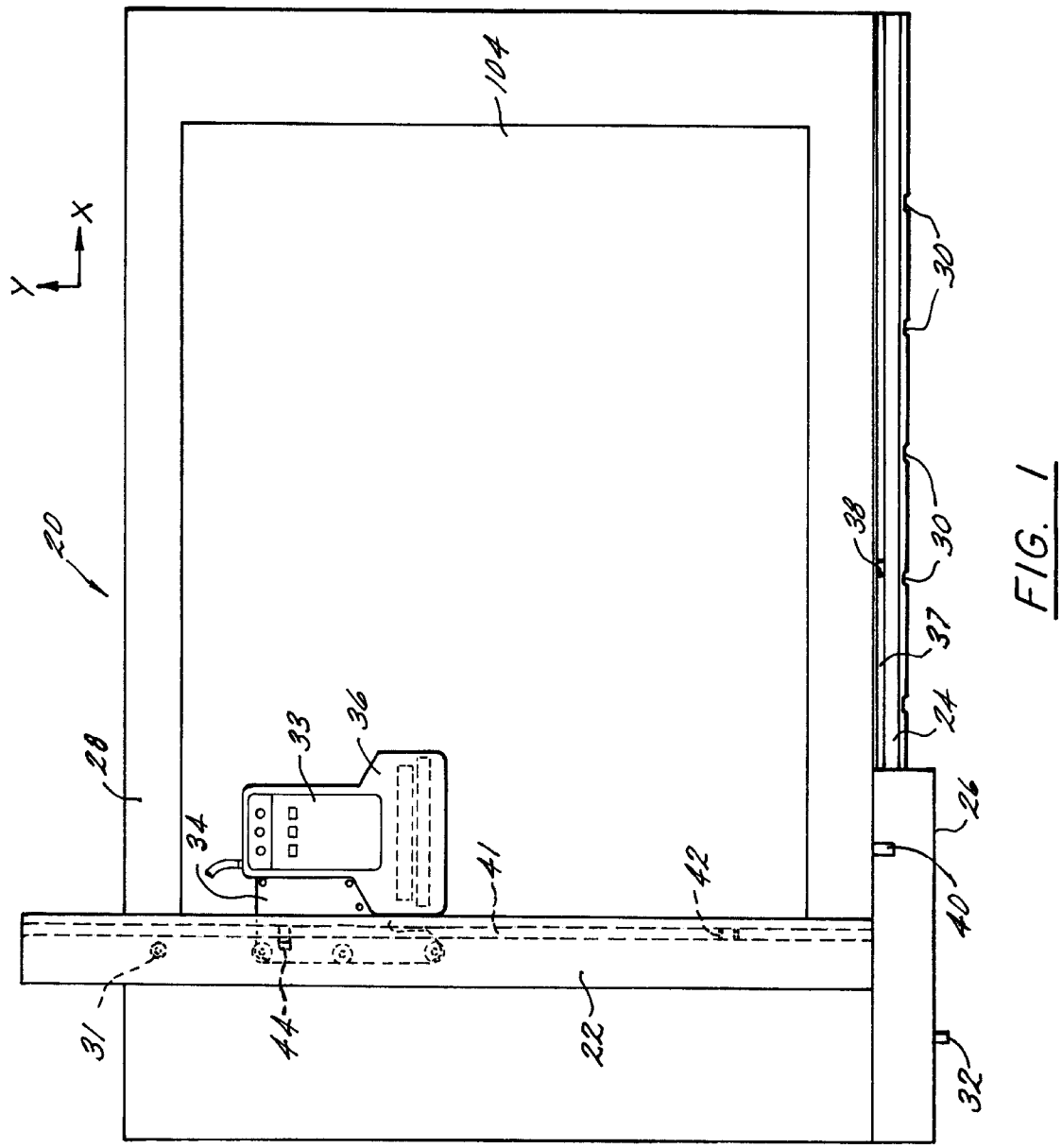
FIG. 1 is a top diagrammatic view of a scanner frame in accordance with the present invention.

Referring to FIG. 1, a scanner frame is shown generally at 20. Scanner frame 20 comprises a vertical (y direction) track or rail 22 which is slidably attached at one end thereof to a horizontal (x direction) track or rail 24. More specifically, track 22 is attached at one end thereof to a sliding member 26 which is disposed on track 24 for sliding lengthwise (horizontally) along track 24. Track 24 is attached to a drawing board 28 or any other suitable flat surface (e.g., drafting table and the like), preferably along the lower edge of board 28. A glide or wheel 30 mounted on track 22 near the end of track 22 opposite the end attached to member 26 at the underside of track 22 between board 28 and track 22, which allows track 22 to move freely along board 28.

Track 24 has a plurality of spaced apart detentes 30 along one side thereof. Detentes 30 are equally spaced apart to define stops, at fixed increments, of the movement of member 26 along track 24. Accordingly, member 26 includes a biased pin or arm (not shown) which engages a detente and locks member 26 (and track 22) at that position. A release 32 must be depressed in order to move member 26 (and track 22) from a locked position.

A sliding carrier 34 is disposed on track 22 for sliding lengthwise (vertically) along track 22. A scanner 36 is attached to carrier 34, whereby scanner 36 travels along track 22. Scanner 36 is a CCD (change coupled device) which preferably reads a 1×1680 pixel area and provides a continuous video output (a linear image signal) indicative of the area read (a scanned line area). More specifically, scanner 36 stores the video data in a 1×1680 bit RAM (random access memory) buffer memory, and then dumps it into a 1×1680 transfer buffer to load the data in a sequence of 1680 bit wide data into memory of a computer (described hereinafter). Scanner 36 is connected to an interface board in the computer via a cable 36. By way of example, scanner 36 may be a commercially available CCD optical imaging head such as the NISCOM 16S Plus. A control panel 33 is also attached to scanner 36 for selecting certain operating modes for the system.

A marker strip 37 comprising uniformly spaced bars 38 is affixed at the upper (or lower) surface of track 24 along the length (horizontal) thereof. These bars 38 are detected by a sensor assembly 40 mounted to sliding member 26. Sensor assembly 40 is aligned with and positioned for detecting bars 38. Sensor assembly 40 comprises two photosensors 76, 78 (FIG. 3) mounted side-by-side on a support (not shown) which is attached to member 26. Another marker strip 41 comprising uniformly spaced bars 42 is affixed at the lower surface of track 22 along the length (vertical) thereof Sensor assembly 44 is mounted to carrier 34, and is aligned with and positioned for detecting bars 42.

The spacing between detentes 30 is dictated by the width at which scanner 36 reads. It is preferred that the spacing between detentes 30 be slightly less than the width scanner 36 is capable of reading. This overlap will assure that all of the drawing is being scanned and will allow for correction of minor mechanical inaccuracies in the frame 20 and detente positions. The system may discard some or all of the overlapped area scanned by only reading a predetermined number of pixels, which is determined by counting a predetermined number of bars 38, which is less than the total number of pixels read by the overlapped amount.

Figure 2:
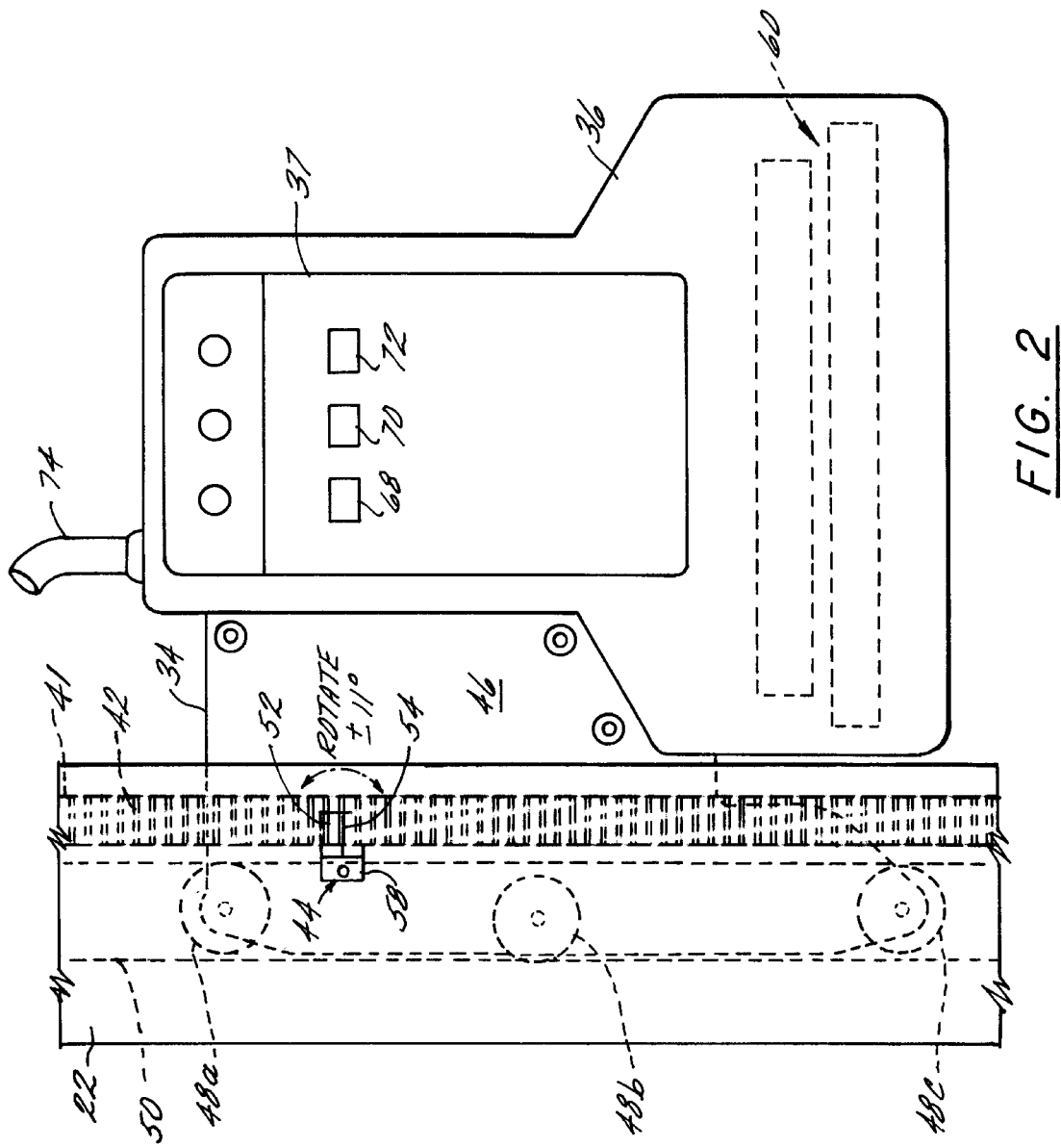
FIG. 2 is a partial exploded top diagrammatic view of the scanner portion of the scanner frame of FIG. 1.

Referring to FIG. 2, carrier 34 comprises a base plate 46 having scanner 36 with control panel 37 attached at one end thereof A plurality of wheels (or bearings) 48*a*–*c* are attached at the other end thereof and are secured within a channel 50 in the underside (i.e., lower surface) of track 22. In order to maintain alignment, it is preferred that wheels 48*a* and can be biased against one side of channel 50 and wheel 48*b* be biased against the other side of channel 50. Channel 50 runs lengthwise through most of the length of track 22 and may include stops at each end thereof to limit the travel of plate 34, and therefor scanner 36. Sensor assembly 44 is mounted on plate 46 and positioned for detecting marker strip 42. Sensor assembly 44 comprises photosensors 52 and 54 mounted on a support 58 which is attached to plate 46.

Scanner 36 includes means 60 for reading an area scanned comprising an array of light emitting diodes, an optical lens and mirror configuration for directing an image to the CCD. Control panel 37 includes visual indicators (e.g., light emitting diodes) 62 for 'IN OPERATION', 64 for 'ALARM' and 66 for 'INSIDE INDEXED AREA'. Control panel 37 further includes actuators or buttons 68 for 'START/STOP', 70 for 'POST SCAN' and 72 for 'NO-SCAN'. Control panel 37 and scanner 36 interface with a computer (not shown) through an interface circuit via a cable 74.

Figure 3:
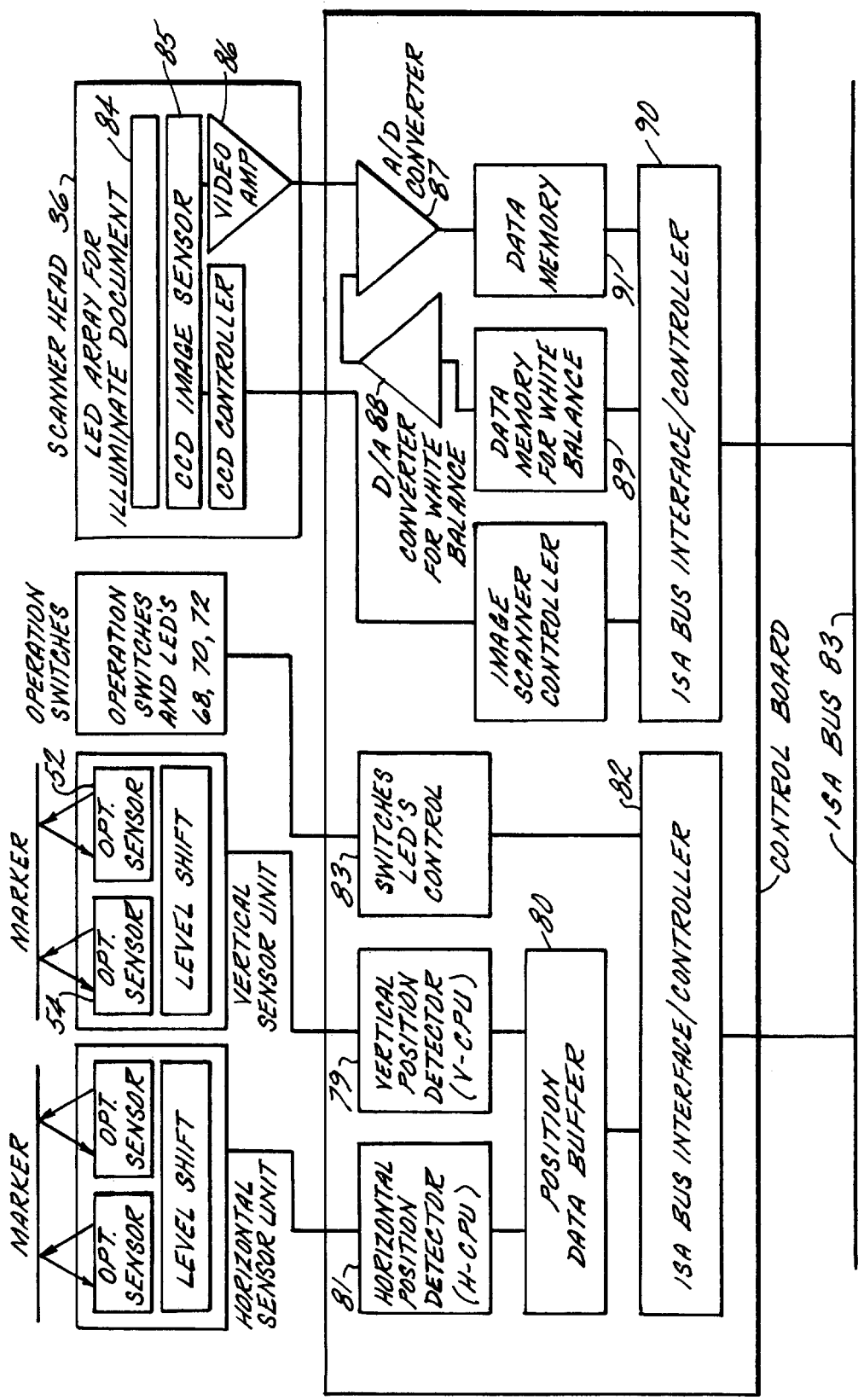
FIG. 3 is a schematic block diagram of the circuits used with the scanner frame of FIG. 1.

Referring to FIG. 3, sensors 52 and 54 are connected to a vertical position detector circuit 79 (i.e., a counting circuit) which is connected to a position data buffer 80. Sensors 76 and 78 are connected to a horizontal position detector circuit 81 (i.e., a counting circuit) which is also connected to position data buffer 80. The output of buffer 80 is connected to a bus interface controller circuit 82 and presented to a bus 83 of the computer. Switches 68, 70 and 72 are connected to a control circuit 83 which is connected to bus interface controller circuit 82 and presented to bus 83. Scanner 36 includes an array 84 of light emitting diodes and a CCD 85. An output of CCD 85 is presented to a video amplifier 86 then to an A/D (analog-to-digital) converter 87. A D/A (digital-to-analog) converter 88 for white balance interfaces with memory 89. A bus interface controller circuit 90 provides interface between memory 89 and bus 83. Converter 88 is connected to converter 87 to correct for white balance in the detected signal. The output of converter 87 is connected to memory 91 which interface with bus 83 through circuit 90.

During use, a drawing 104 (FIG. 1) to be scanned is secured on board 28, track 22 is positioned at the beginning position (i.e., the left most detente position in FIG. 1 with scanner 36 on the drawing) where member 26 is engaged by one of the detentes 30 in track 24 and scanner 36 is positioned at the upper end of track 22. In a manual mode, the START/STOP button 68 is used to select start and finish index positions on the drawing 104 being scanned. In an automatic mode, the boarders are utilized as the start and finish index positions. The starting and ending locations of the drawing area to be scanned is defined using the index positions. The purpose of this function is to define where to start and finish a scan. More importantly, a location coordinate system relative to the original drawing is defined, which is independent of drawing position relative to the frame. Accordingly, when scanning is started the light emitting diodes of scanner 36 are turned on and data is transmitted and recorded precisely starting at the start index location and finishing at the finish index location. Once the extents (i.e., the start and finish index locations) are entered, the system has been initialized. Thereafter, scanner 36 will automatically turn on and off within these boundary locations. Further, indicator 66 for 'INSIDE INDEXED AREA' will be on when scanner 36 is within these boundaries and will be off when scanner 36 is outside these boundaries.

Once a block of data has been scanned, system software will prevent data which has already been scanned from accidently being rescanned. Scanned segments (i.e. defined areas) are stored in blocks of data (as address blocks) which are sequentially appended by the system software to a previously scanned block of data. These blocks of data (address blocks) are assembled with reference to a physical location (defined areas) which is measured by sensor assemblies 44, 40 and corresponding marker strips 42, 38. In an alternatate embodiment, the size of these blocks may be user defined in the system software.

Once the system has been initialized, as described above, the drawing 104 is scanned by positioning scanner 36 at the beginning position, by first pressing the START/STOP button 68 (or using an on screen computer menu) then slowly moving scanner 36 down the first block or column. Alternatively, scanner 36 may be automatically driven by a motor or other suitable means. A beep or other indication is provided when scanner 36 is automatically turned on by the system software when it is in the defined area to be scanned. More importantly, data is only transmitted from scanner 36 (or received at the computer) when it is inside the defined area to be scanned. After a block has been scanned a beep or other indication, e.g., indicator 64 for 'ALARM' may be used, is provided to signal that a block has been scanned and data is no longer be transmitted by scanner 36 (or received at the computer). This scanned block is then stored in the computer along with a corresponding location header. In order to continue scanning, the scanner must be moved to the next unscanned line. It is acceptable to move the scanner into the previously scanned block, at which point another beep or other indicator is provided signaling that the first line of the unscanned menu has been reached and scanning is resumed. The system software assures that data will not be transmitted by scanner 36 (or received by the computer) until the first line of the next block is entered, since the system will not rescan a scanned area in this mode. After this block has been scanned the system software will append this block to the previous block on the computer screen image, but the actual files are maintained. This is continued until all the blocks within each defined scanned area have been scanned. This is accomplished by moving member 26 across the drawing one detente at a time. Each block is stored with a header code identifying it. Accordingly, the system software will correctly position each block on the computer screen according to that block's header code. This is why the order in which the document is scanned is not important.

Figure 4:
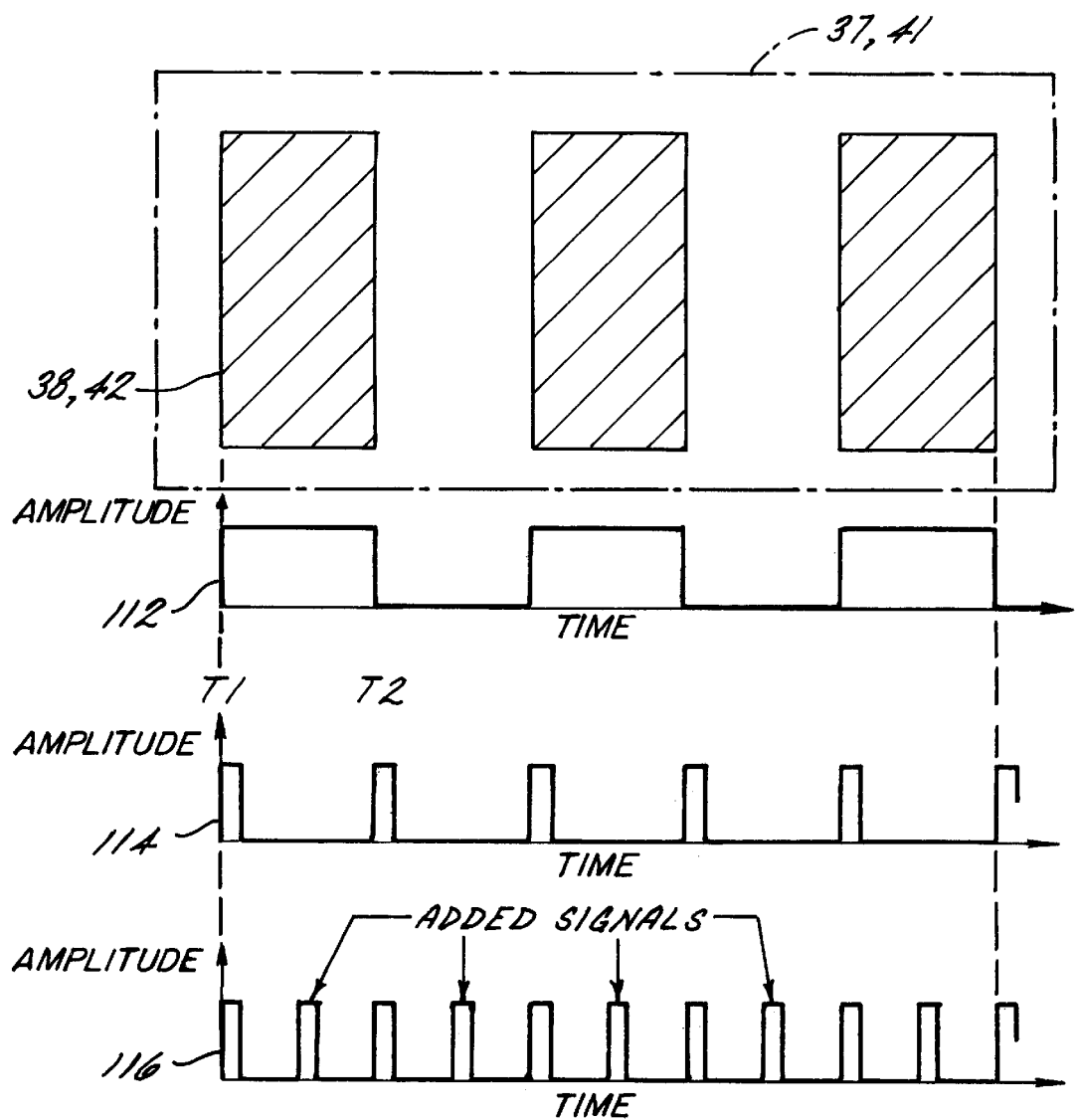
FIG. 4 is a series of diagrammatic views showing markers and corresponding waveforms found in the scanner frame of FIG. 1.

Referring to FIG. 4, the marker strips 37 and 41 are each comprised of a series of equally spaced apart printed bars 38 and 42 (i.e., markers or lines), respectively. For example, alternating black and white imprinted bars on a tape or film which is adhered to the corresponding track. As described above these bars are counted to determine scanner 36 position relative to the start up origin, (x=0, y=0). The thickness of each bar is determined by the sensor requirement. The pitch of these bars determines the resolution. At a pitch of 0.02 or 50 bars/inch the counter resolution will be 100 bars/inch. Accordingly, when the corresponding sensor assembly reads these bars a series or train of pulses 112 are produced, in this example 50 pulses/inch. The number of pulses can be doubled by triggering on both the rising and falling edges, as is well known, of the pulses 112 resulting in the series of pulses 114 (i.e., 100 pulses/inch). Next, the time period between a pair of pulses 114 is calculated in system software to predict the period between the next pair of pulses 144. This is accomplished by initiating a high speed counter at the rising edge of the first pulse 114 and stopping the high speed counted at the rising edge of the next pulse 114. This count is divided by two (or three depending on the selected scan resolution) and stored to provide a pulse initiate count. Thereafter, when the rising edge of the next pulse 114 is encountered the pulse initiator count is started and at the end of its count one pulse (or two) is inserted resulting in the series of pulses 116. This is repeated for each subsequent pair of pulses. It is believed that the assumption that the time period between a pair of pulses and the immediately following pair of pulses will be close enough for any consecutive pairs that this estimation can be used. The resulting series of pulses are presented to a counter circuit, which reads the rising and falling edges of the pulse, effectively doubling the resolution once more. This method effectively multiplies the counter resolution, in this example to 400 pulses/inch. It will be appreciated that additional pulses could be added using this method and such is dictated by user requirements. The rate at which scanner 36 is moved is monitored by monitoring the rate at which the count is incremented, so that an alarm or warning, e.g., indicator 64 for 'ALARM' may be used, when scanner 36 is moved faster than it can scan.

It is preferred that the count employ quadrature, whereby the direction of travel of scanner 36 is known. Accordingly, sensor assemblies 44 and 40 are rotated, whereby the photosensor pair are rotated rather than aligned as discussed below. In this embodiment the strip marker 37, 41 configuration shown in FIG. 4 is employed. However, due to this intentional misalignment the output of the photosensors within a pair will be shifted, resulting in the waveforms 124', 122' shown in FIGS. 5 and 6, described below. Further, these signals may be processed in accordance with either the method described below with reference to FIG. 5 or the method described with reference to FIGS. 6 and 7.

Figure 5:
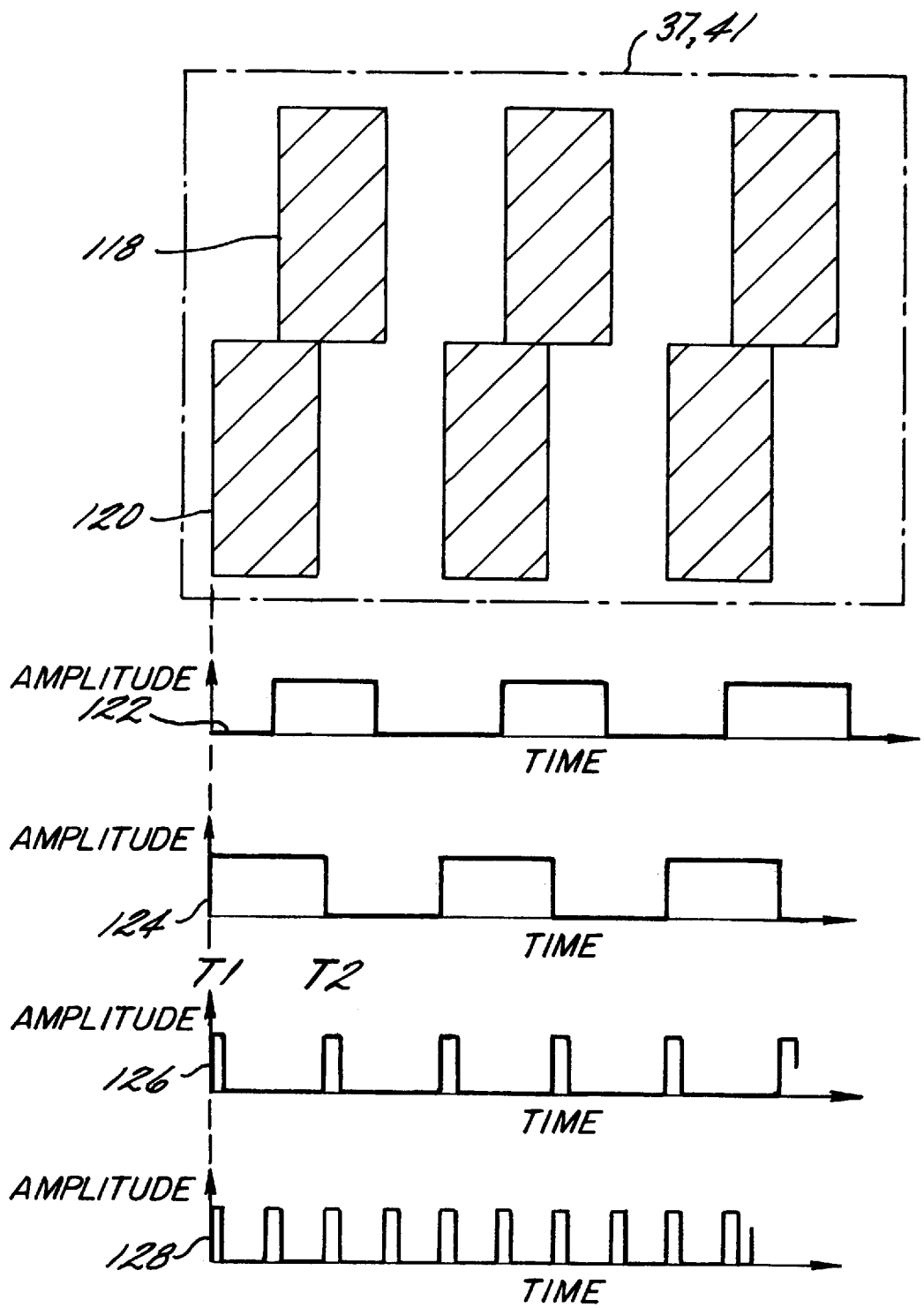
FIG. 5 is a series of diagrammatic views showing markers and corresponding waveforms found in the scanner frame of FIG. 1 in accordance with an alternate embodiment.

Referring to FIG. 5, marker strips 37 and 41 are each preferably comprised of a first series of equally spaced apart printed bars or lines 118 and a second series of equally spaced apart printed bars or lines 120 which are shifted in relationship to line 118. For example, each comprising alternating black and white imprinted bars on a single tape or film which is adhered to the corresponding track. Each series of bars is read by a separate photosensor. More specifically, for marker strip 41 bars 118 are read by photosensor 52 and bars 120 are read by photosensor 54 and for marker strip 37 bars 118 are read by photosensor 76 and bars 120 are read by photosensor 78. It is important that each photosensor pair be in alignment, i.e., photosensor pair 52, 54, photosensor pair 76, 78, with the makers. Accordingly depending on which bar 118 or 120 is detected next by the corresponding photosensor, the direction of travel will be known. It will be appreciated that this applies to both vertical (marker strip 41) and horizontal (marker strip 37) travel. Only one of these bars, in this example bars 120, for each of the marker strips is used to determine scanner 36 position (i.e., distance) relative to the origin, (x=0, y=0). Again, the thickness of each bar is determined by the pitch, e.g., with a pitch of 0.02 or 50 bars/inch the counter resolution will be 100 bars/inch. When the corresponding photosensor reads the bars 118 a series or train of pulses 122 are produced. When the corresponding photosensor reads the bars 120 a series or train of pulses 124 are produce. In this example, these pulses are 100 pulses/inch with a fifty percent duty cycle. As discussed above, the number of pulses 124 can be doubled by triggering on both the rising and falling edges of the pulses 124 resulting in the series of pulses 126 (i.e., 200 pulses/inch) with a duty cycle of ⅓ on and ⅔ off. Since the counter reads both the rising and falling edges the count is again divided. Further, pulses are inserted as described above resulting in the series of pulses 128 which are presenter to a counter circuit. It will be appreciated that the number of additional pulses added is dictated by user requirements.

The added pulses described above whose time intervals are estimated so that they may be inserted between the next pair of pulses do not delay or cancel the next pulse. If there is insufficient time to insert the added pulses, then excess pulses which have not been inserted will be inserted immediately after the next pulse. It will be appreciated that the added pulses should have a pulse width which is the shortest duration the counter circuit will allow. This function is to be carried on recursively. In other words, if there is an overflow then those added pulses not inserted should be carried over and inserted after the next pulse, and so on. Using this method the added pulses will be inserted by the end of each defined block. Otherwise distortion will result in the image of the scanned drawing.

Figure 6:
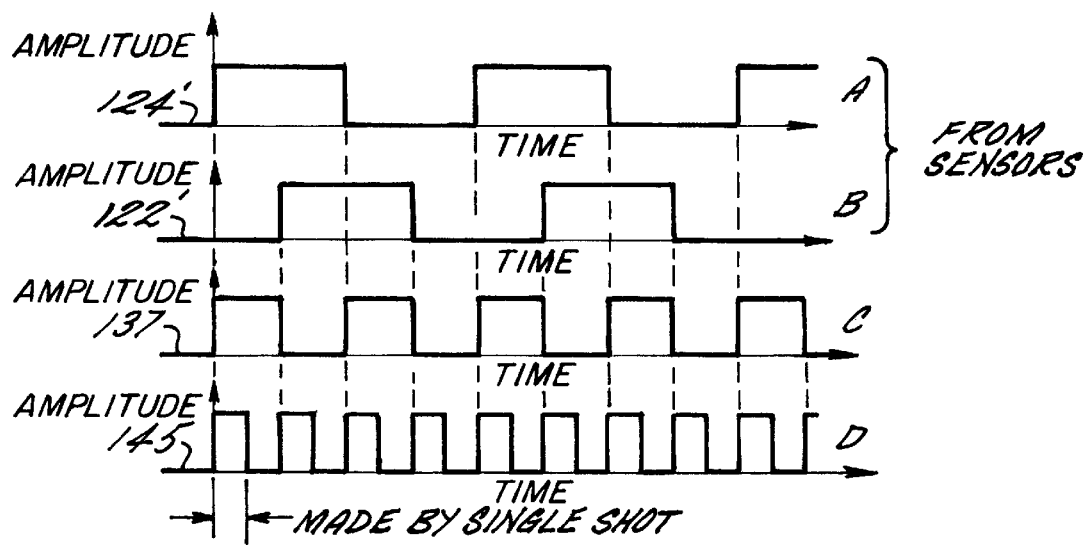
FIG. 6 is a series of diagrammatic views showing waveforms found in the scanner frame of FIG. 1 in accordance with yet another alternate embodiment.
Figure 7:
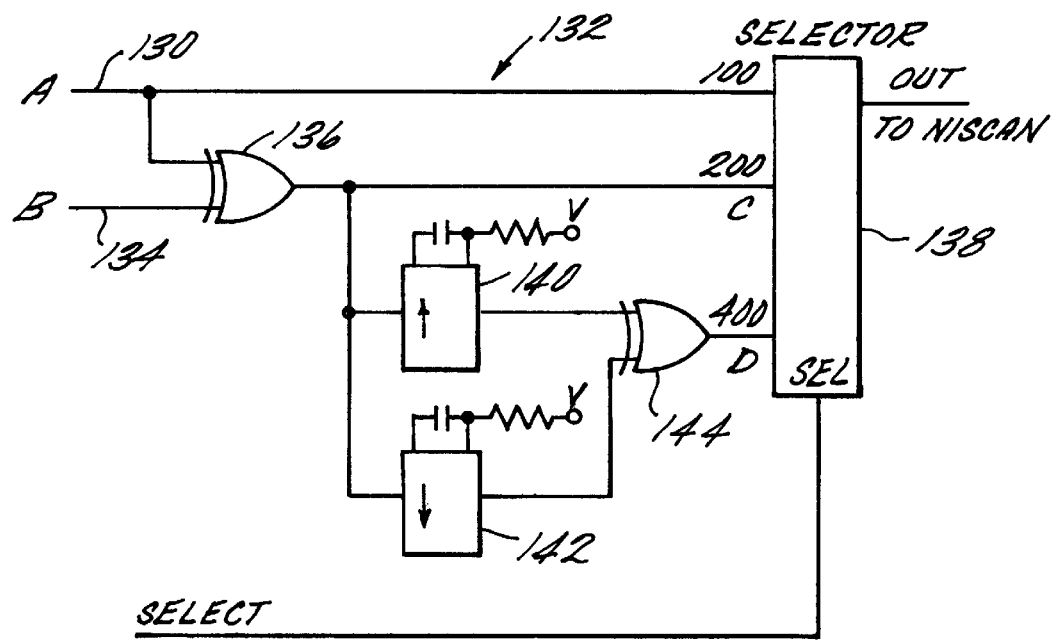
FIG. 7 is a schematic diagram of a counter circuit used with the scanner frame of FIG. 1 in accordance with an alternate embodiment.

Referring to FIGS. 6 and 7, in an alternate embodiment pulses 124' and pulses 122' are combined in a EXCLUSIVE-OR gate 136 the output (waveform 137) of which is presented to a selector 138 and to monostable multivibrators (i.e., one-shots) 140, 142, one of which triggers on the rising edge and one of which triggers on the falling edge. The output of one-shoots 140, 142 are combined by an EXCLUSIVE-OR gate 144 the output (waveform 145) of which is presented to selector 138. In this example, the output of selector 138 provides the effective increased counter resolution.

Button 70 provides for selection of 'POST SCAN' functions. In a replace mode a one scanned block replaces another scanned block. In a overlay or merge mode scanned lines from two scanned block are combined. In an insert mode a portion of one scanned block replaces a portion of another scanned block. OCR or other special interpreter functions can be selected. Portions can be reproduced using algorithms which define specific features. A single block can accessed and modified in its present raster format. Alternatively, a single block can be accessed and modified using an overlay program, whereby it is redrawn or traced in CAD format and the modified block then converted back to the raster format and inserted back into the program.

Button 72 provides for selection of the 'NO-SCAN' function, whereby data is not read from scanner 36, instead code indicative of white space with a multiplier function is assigned at the locations selected.

Other features may be provided as dictated by the particular application. These may be included by way of addition buttons or switches, or may be defined in the system software whereby selection of such would be made at the computer, as are several of the above features. Further, the size of the drawing to be scanned is limited only by the size of the scanner frame 20 itself.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A scanning device comprising:

a first track;

a second track slidably attached to said first track for slidably moving said second track along said first track;

scanner means for optically scanning a document and providing a plurality of linear image signals each being indicative of a corresponding scanned line area of the document, said scanner means slidably attached to said second track for slidably moving said scanner means along said second track;

first position sensor means for sensing a relative position of said second track in relation to said first track, said first position sensor means providing a first position signal indicative of said relative position of said second track in relation to said first track;

second position sensor means for sensing a relative position of said scanner means in relation to said second track, said second position sensor means providing a second position signal indicative of said relative position of said scanner means in relation to said second track; and signal processing means responsive to said first and second position signals for identifying a plurality of defined areas relative to said first and second tracks which correspond to a plurality of address blocks in memory means of said signal processing means, said linear image signals corresponding to the scanned line areas of the document within each of said defined areas being stored in a corresponding said address block, each of said address blocks being appended to another in accordance with relative position of corresponding said defined areas.

2. The scanning device of claim 1 further comprising:

a plurality of spaced apart detentes in said first track; and detente engagement means disposed on said second track for releasably engaging said detentes, whereby movement of said second track along said first track is stopped at each of said detentes.

3. The scanning device of claim 2 wherein said detentes are equally spaced apart at a distance less than the width of the scanned line area.

4. The scanning device of claim 1 wherein:

said first position sensor means comprises, (a) a first marker strip disposed longitudinally on said first track, said first marker strip comprising a first plurality of equally spaced apart markers, and (b) a first photosensor disposed on said second track and positioned for detecting said first markers, said first photosensor providing said first position signal comprising a series of pulses in response to said first markers detected; and said second position sensor means comprises, (a) a second marker strip disposed longitudinally on said second track, said second marker strip comprising a second plurality of equally spaced apart markers, and (b) a second photosensor disposed on said scanner means and positioned for detecting said second markers, said second photosensor providing said second position signal comprising a series of pulses in response to said second markers detected.

5. The scanning device of claim 4 wherein:

said first markers comprise a first series of equally spaced apart markers and a second series of equally spaced markers, said second series of equally spaced markers being shifted in relation to said first series of equally spaced markers;

said first photosensor comprising a first photosensor pair, said first photosensor pair being in general alignment with said first markers, one of said first photosensor pair positioned for detecting said first series of markers and for providing a first counter signal comprising a series of pulses indicative of said first series of markers detected, the other one of said first photosensor pair positioned for detecting said second series of markers and for providing a second counter signal comprising a series of pulses indicative of said second series of markers detected;

said signal processing means for determining a direction of movement of said second track along said first track in response to said first and second counter signals, and for determining a distance of movement of said second track along said first track in response to at least one of said first and second counter signals, thereby determining said relative position of said second track in relation to said first track;

said second markers comprise a third series of equally spaced apart markers and a fourth series of equally spaced markers, said fourth series of equally spaced markers being shifted in relation to said third series of equally spaced markers;

said second photosensor comprising a second photosensor pair, said second photosensor pair being in general alignment with said second markers, one of said second photosensor pair positioned for detecting said third series of markers and for providing a third counter signal comprising a series of pulses indicative of said third series of markers detected, the other one of said second photosensor pair positioned for detecting said fourth series of markers and for providing a fourth counter signal comprising a series of pulses indicative of said fourth series of markers detected; and said signal processing means for determining a direction of movement of said scanner means along said second track in response to said third and fourth counter signals, and for determining a distance of movement of said scanner means along said second track in response to at least one of said first and second counter signals, thereby determining said relative position of said scanner means in relation to said second track.

6. The scanning device of claim 5 further comprising:

means for combining said first and second counter signals to determine of movement of said second track along said first track resulting in a first waveform having an increased number of pulses per unit of distance, whereby the resolution thereof is increased; and means for combining said third and fourth counter signals to determine of movement of said scanner means along said second track resulting in a second waveform having an increased number of pulses per unit of distance, whereby the resolution thereof is increased.

7. The scanning device of claim 4 wherein:

said first photosensor comprising a first photosensor pair positioned for detecting said first markers, said first photosensor pair being in nonalignment with said first markers, one of said first photosensor pair providing a first counter signal comprising a series of pulses indicative of said first markers detected, the other one of said first photosensor pair providing a second counter signal comprising a series of pulses indicative of said first markers detected, said pulses of said second counter signal being shifted in relation to said pulses of said first counter signal;

said signal processing means for determining a direction of movement of said second track along said first track in response to said first and second counter signals, and for determining a distance of movement of said second track along said first track in response to at least one of said first and second counter signals, thereby determining said relative position of said second track in relation to said first track;

said second photosensor comprising a second photosensor pair positioned for detecting said second markers, said second photosensor pair being in nonalignment with said second markers, one of said second photosensor pair providing a third counter signal comprising a series of pulses indicative of said second markers detected, the other one of said second photosensor pair providing a fourth counter signal comprising a series of pulses indicative of said second markers detected, said pulses of said fourth counter signal being shifted in relation to said pulses of said third counter signal; and said signal processing means for determining a direction of movement of said scanner means along said second track in response to said third and fourth counter signals, and for determining a distance of movement of said scanner means along said second track in response to at least one of said first and second counter signals, thereby determining said relative position of said scanner means in relation to said second track.

8. The scanning device of claim 7 wherein said signal processing means responsive to said first and second counter signals of said first position sensor means and said signal processing means responsive to said first and second counter signals of said second position sensor means each employ quadrature for determining a count.

9. The scanning device of claim 7 further comprising:

means for combining said first and second counter signals to determine of movement of said second track along said first track resulting in a first waveform having an increased number of pulses per unit of distance, whereby the resolution thereof is increased; and means for combining said third and fourth counter signals to determine of movement of said scanner means along said second track resulting in a second waveform having an increased number of pulses per unit of distance, whereby the resolution thereof is increased.

10. The scanning device of claim 4 further comprising:

means for increasing the number of pulses per unit of distance in each of said first and second position signals, whereby the resolution thereof is increased.

11. The scanning device of claim 10 wherein said means for increasing comprises:

means for generating a first waveform having pulses generated in response to the rising and falling edges of the pulses of said first position signal;

means for timing the distance between pulses of said first waveform;

means for dividing the timed distance between pulses of said first waveform into an increment thereof;

means for inserting pulses at said increment between said pulses of said first waveform generating a second waveform having an increased number of pulses per unit distance;

means for generating a third waveform having pulses generated in response to the rising and failing edges of the pulses of said second position signal;

means for timing the distance between pulses of said third waveform;

means for dividing the timed distance between pulses of said third waveform into an increment thereof; and means for inserting pulses at said increment between said pulses of said third waveform generating a fourth waveform having an increased number of pulses per unit distance.

12. A method of scanning a document comprising the steps of:

optically scanning a document by slidably moving scanner means along a first track which is slidable along a second track to provide a plurality of linear image signals each being indicative of a corresponding scanned line area of the document;

sensing a relative position of said first track in relation to said second track to provide a first position signal indicative of said relative position of said first track in relation to said second track;

sensing a relative position of said scanner means in relation to said first track to provide a second position signal indicative of said relative position of said scanner means in relation to said first track;

in response to said first and second position signals, identifying a plurality of defined areas relative to said first and second tracks which correspond to a plurality of address blocks;

storing said linear image signals corresponding to the scanned line areas of the document within each of said defined areas in a corresponding said address block; and appending each of said address blocks to another in accordance with relative positioning of corresponding said defined areas.

13. The method of claim 12 wherein:

said step of sensing a relative position of said first track comprises detecting a first plurality of equally spaced apart markers disposed longitudinally on said second track to provide said first position signal comprising a series of pulses; and said step of sensing a relative position of said scanner means comprises detecting a second plurality of equally spaced apart markers disposed longitudinally on said first track to provide said second position signal comprising a series of pulses.

14. The method of claim 13 further comprising the step of:

increasing the number of pulses per unit of distance in each of said first and second position signals, whereby the resolution thereof is increased.

15. The method of claim 14 wherein said step of increasing comprises:

generating a first waveform having pulses generated in response to the rising and falling edges of the pulses of said first position signal;

timing the distance between pulses of said first waveform;

dividing the timed distance between pulses of said first waveform into an increment thereof;

inserting pulses at said increment between said pulses of said first waveform generating a second waveform having an increased number of pulses per unit distance;

generating a third waveform having pulses generated in response to the rising and falling edges of the pulses of said second position signal;

timing the distance between pulses of said third waveform;

dividing the timed distance between pulses of said third waveform into an increment thereof; and inserting pulses at said increment between said pulses of said third waveform generating a fourth waveform having an increased number of pulses per unit distance.

16. The method of claim 12 wherein:

said step of sensing a relative position of said first track comprises, (a) detecting a first series of equally spaced apart markers disposed longitudinally on said second track to provide a first counter signal comprising a series of pulses indicative of said first series of markers detected, using a first photosensor, said first photosensor being in general alignment with said first series of markers, and (b) detecting a second series of equally spaced apart markers disposed longitudinally on said second track to provide a second counter signal comprising a series of pulses indicative of said second series of markers detected, using a second photosensor, said second series of equally spaced markers being shifted in relation to said first series of equally spaced markers, said second photosensor being in general alignment with said second series of markers, (c) determining a direction of movement of said first track along said second track in response to said first and second counter signals, and (d) determining a distance of movement of said first track along said second track in response to at least one of said first and second counter signals, thereby determining said relative position of said first track in relation to said second track; and said step of sensing a relative position of said scanner means comprises, (a) detecting a third series of equally spaced apart markers disposed longitudinally on said first track to provide a third counter signal comprising a series of pulses indicative of said third series of markers detected, using a third photosensor, said third photosensor being in general alignment with said third series of markers, and (b) detecting a fourth series of equally spaced apart markers disposed longitudinally on said first track to provide a fourth counter signal comprising a series of pulses indicative of said fourth series of markers detected, using a fourth photosensor, said second series of equally spaced markers being shifted in relation to said first series of equally spaced markers, said fourth photosensor being in general alignment with said fourth series of markers, (c) determining a direction of movement of said scanner means along said first track in response to said third and fourth counter signals, and (d) determining a distance of movement of said scanner means along said first track in response to at least one of said third and fourth counter signals, thereby determining said relative position of said scanner means in relation to said first track.

17. The method of claim 16 further comprising the steps of:

combining said first and second counter signals to determine of movement of said first track along said second track resulting in a first waveform having an increased number of pulses per unit of distance, whereby the resolution thereof is increased; and combining said third and fourth counter signals to determine of movement of said scanner means along said first track resulting in a second waveform having an increased number of pulses per unit of distance, whereby the resolution thereof is increased.

18. The method of claim 12 wherein:

said step of sensing a relative position of said first track comprises,
 (a) detecting a first series of equally spaced apart markers disposed longitudinally on said second track to provide a first counter signal comprising a series of pulses indicative of said first series of markers detected, using a first photosensor, said first photosensor being in nonalignment with said first series of markers, and
 (b) detecting said first series of markers to provide a second counter signal comprising a series of pulses indicative of said first series of markers detected, using a second photosensor, said pulses of said second counter signal being shifted in relation to said pulses of said first counter signal, said second photosensor being in nonalignment with said first series of markers,
 (c) determining a direction of movement of said first track along said second track in response to said first and second counter signals, and
 (d) determining a distance of movement of said first track along said second track in response to at least one of said first and second counter signals, thereby determining said relative position of said first track in relation to said second track; and said step of sensing a relative position of said scanner means comprises,
 (a) detecting a second series of equally spaced apart markers disposed longitudinally on said first track to provide a third counter signal comprising a series of pulses indicative of said third series of markers detected, using a third photosensor, said third photosensor being in general alignment with said third series of markers, and
 (b) detecting said second series of markers to provide a fourth counter signal comprising a series of pulses indicative of said second series of markers detected, using a fourth photosensor, said pulses of said fourth counter signal being shifted in relation to said pulses of said third counter signal, said fourth photosensor being in nonalignment with said fourth series of markers,
 (c) determining a direction of movement of said scanner means along said first track in response to said third and fourth counter signals, and
 (d) determining a distance of movement of said scanner means along said first track in response to at least one of said third and fourth counter signals, thereby determining said relative position of said scanner means in relation to said first track.

19. The method of claim 18 further comprising the steps of:

combining said first and second counter signals to determine of movement of said first track along said second track resulting in a first waveform having an increased number of pulses per unit of distance, whereby the resolution thereof is increased; and combining said third and fourth counter signals to determine of movement of said scanner means along said first track resulting in a second waveform having an increased number of pulses per unit of distance, whereby the resolution thereof is increased.

* * * * *